US012594704B2

(12) United States Patent (10) Patent No.: US 12,594,704 B2
Yoshida et al. (45) Date of Patent: Apr. 7, 2026

(54) MOLD STRUCTURE AND METHOD FOR MANUFACTURING MOLDED PRODUCT

(71) Applicant: TOYODA IRON WORKS CO., LTD., Toyota (JP)

(72) Inventors: Takashi Yoshida, Toyota (JP); Kaiho Komoto, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 192 days.

(21) Appl. No.: 18/291,112

(22) PCT Filed: Nov. 9, 2022

(86) PCT No.: PCT/JP2022/041648
§ 371 (c)(1),
(2) Date: Jan. 22, 2024

(87) PCT Pub. No.: WO2023/095608
PCT Pub. Date: Jun. 1, 2023

(65) Prior Publication Data
US 2024/0359378 A1     Oct. 31, 2024

(30) Foreign Application Priority Data
Nov. 24, 2021     (JP) ................................. 2021-189849

(51) Int. Cl.
*B29C 45/44*          (2006.01)
*B29C 45/26*          (2006.01)
(Continued)

(52) U.S. Cl.
CPC .......... *B29C 45/4407* (2013.01); *B29C 45/26* (2013.01); *B29C 45/43* (2013.01);
(Continued)

(58) Field of Classification Search
CPC ..... B29C 45/4407; B29C 45/26; B29C 45/43; B29C 2045/445; B29C 2045/4492; B29K 2023/00; B29K 2027/06
(Continued)

(56) References Cited

U.S. PATENT DOCUMENTS 5,609,894 A     3/1997  Rathbun

FOREIGN PATENT DOCUMENTS

DE        195 28 414 A1    2/1997
JP        H10-202704 A     8/1998
JP        2014-100897 A    6/2014

OTHER PUBLICATIONS

Aug. 14, 2025 extended Search Report issued in European Patent Application No. 22898392.0.

*Primary Examiner* — Christina A Johnson
*Assistant Examiner* — Xue H Liu
(74) *Attorney, Agent, or Firm* — OLIFF PLC

(57)          ABSTRACT

A mold structure includes a fixed mold and a movable mold, and a first insert and a second insert disposed in the movable mold. A molded product includes a plate-shaped body, a side wall, and a wrapped portion. The side wall has a basal end region that is curved and connected to the body. The first insert is located at a position corresponding to the side wall inside the molded product. The second insert is located at a position corresponding to the body inside the molded product. The second insert has a contact surface for the molded product. When the mold structure is clamped, an edge of the contact surface is located closer to a distal end of the side wall than a position where the basal end region of the side wall is connected to the body.

5 Claims, 4 Drawing Sheets

(51) Int. Cl.
*B29C 45/43* (2006.01)
*B29K 21/00* (2006.01)
*B29K 23/00* (2006.01)
*B29K 27/06* (2006.01)

(52) U.S. Cl.
CPC .............................. *B29C 2045/445* (2013.01); *B29C 2045/4492* (2013.01); *B29K 2021/003* (2013.01); *B29K 2023/00* (2013.01); *B29K 2027/06* (2013.01)

(58) Field of Classification Search
USPC ......................................................... 264/318
See application file for complete search history.

MOLD STRUCTURE AND METHOD FOR MANUFACTURING MOLDED PRODUCT

TECHNICAL FIELD

The present invention relates to a mold structure and a method for manufacturing a molded product.

BACKGROUND ART

A molded product manufactured by resin injection molding may include a plate-shaped body, a side wall, and a wrapped portion. The side wall is located at an outer edge of the body and protrudes toward one side in a thickness direction of the body. The wrapped portion is located at a distal end of the side wall in the protruding direction and protrudes inward of the side wall.

As disclosed in Patent Literature 1, a mold structure for manufacturing such a molded product includes a fixed mold and a movable mold, and includes a first insert and a second insert disposed in the movable mold. In the mold structure, molten resin is injected between the fixed mold and the movable mold when the mold structure is clamped. When the resin solidifies between the fixed mold and the movable mold, the first insert and the second insert are positioned inside the molded product. Specifically, the first insert is positioned corresponding to the side wall of the molded product, and the second insert is positioned corresponding to the body of the molded product. Subsequently, when the mold structure is opened, the second insert is pulled out of the molded product by moving relative to the first insert in a direction away from the first insert. Then, with the first insert pulled out of the molded product, the molded product is removed from the second insert.

CITATION LIST

Patent Literature

Patent Literature 1: Japanese Laid-Open Patent Publication No. 10-202704

SUMMARY OF INVENTION

Technical Problem

In some molded products, the basal end of the side wall is curved and connected to the body. In this case, the width of the side wall extending outward beyond the body is relatively large. When such a molded product is manufactured using the above mold structure, the following problem occurs.

When the mold structure is opened and the first insert is moved relative to the second insert in a direction away from the second insert to be removed from the molded product, the side wall of the molded product is pulled by the first insert. When the pulling force acts on the side wall, stress concentrates on a portion of the molded product that is in contact with the second insert. As the width of the side wall extending outward beyond the body increases, the stress increases so that the molded product may be deformed.

Solution to Problem

A mold structure according to an aspect of the present disclosure is used for manufacturing a molded product. The molded product includes a plate-shaped body, a side wall, and a wrapped portion. The side wall protrudes from an outer edge of the body toward one side in a thickness direction of the body. The side wall has a basal end region that is curved and connected to the body. The wrapped portion protrudes inward of the side wall from a distal end of the side wall. The mold structure includes a fixed mold and a movable mold, and a first insert and a second insert disposed in the movable mold. The mold structure is configured such that molten resin is injected between the fixed mold and the movable mold when the mold structure is clamped. When the resin solidifies between the fixed mold and the movable mold, the first insert is located at a position corresponding to the side wall inside the molded product, and the second insert is located at a position corresponding to the body inside the molded product. The first insert is configured to be pulled out of the molded product by separating from the second insert when the mold structure is opened. The molded product is removed from the second insert with the first insert pulled out of the molded product. The second insert has a contact surface for the molded product. When the mold structure is clamped, an edge of the contact surface is located closer to the distal end of the side wall than a position where the basal end region of the side wall is connected to the body.

Another aspect of the present disclosure provides a method for manufacturing a molded product. The molded product includes a plate-shaped body, a side wall, and a wrapped portion. The side wall protrudes from an outer edge of the body toward one side in a thickness direction of the body. The side wall has a basal end region that is curved and connected to the body. The wrapped portion protrudes inward of the side wall from a distal end of the side wall. The method includes a step of preparing a mold structure that includes a movable mold and a fixed mold. A first insert and a second insert are disposed in the movable mold. The method further includes a step of injecting molten resin between the movable mold and the fixed mold when the mold structure is clamped. When the resin solidifies between the fixed mold and the movable mold, the first insert is located at a position corresponding to the side wall inside the molded product, and the second insert is located at a position corresponding to the body inside the molded product. The method further includes a step of pulling the first insert out of the molded product by separating the second insert and the first insert from each other when opening the mold structure and a step of removing the molded product from the second insert with the first insert pulled out of the molded product. The second insert has a contact surface for the molded product. When the mold structure is clamped, an edge of the contact surface is located closer to the distal end of the side wall than a position where the basal end region of the side wall is connected to the body.

DESCRIPTION OF EMBODIMENTS

A mold structure and a method for manufacturing a molded product according to an embodiment will now be described with reference to FIGS. 1 to 3.

Figure 1:
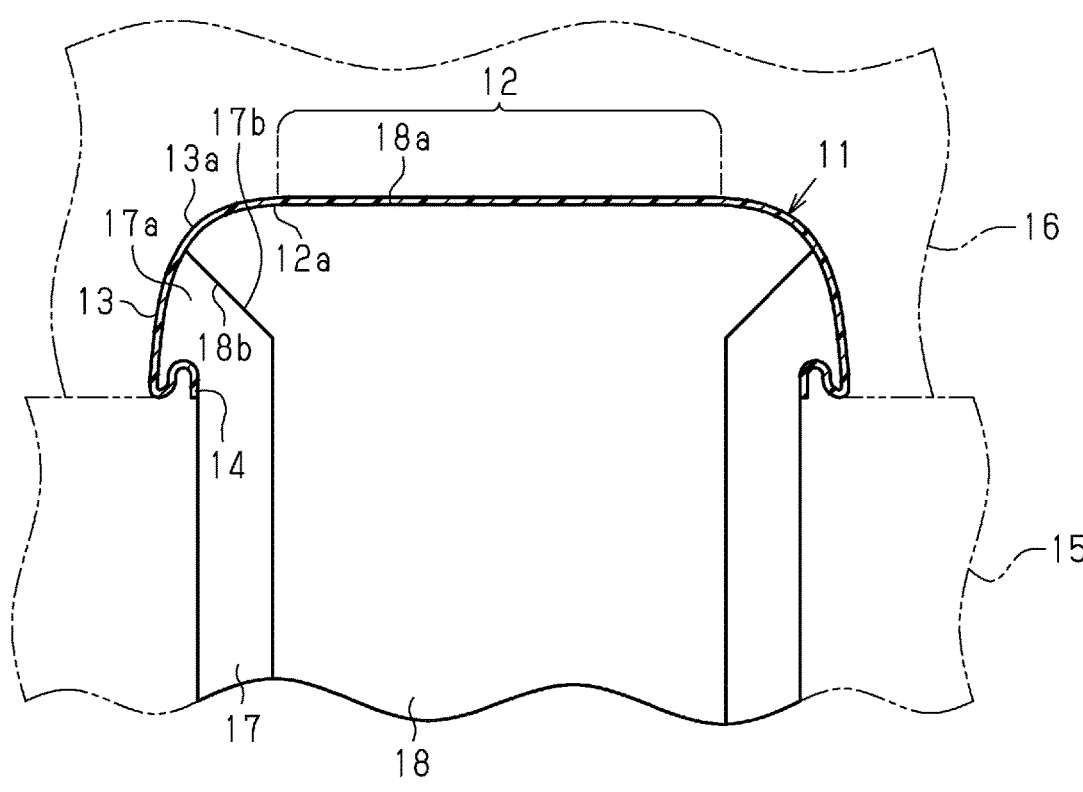
FIG. 1 is a schematic view showing a mold structure.

FIG. 1 shows a mold structure for manufacturing a resin molded product 11. The molded product 11 is, for example, a covering of a component such as an armrest or an instrument panel in a vehicle. Examples of the resin forming the molded product 11 include a resin such as an olefin-based thermoplastic elastomer (TPO) and polyvinyl chloride (PVC).

Molded Product 11

The molded product 11 includes a plate-shaped body 12, side walls 13, and wrapped portions 14. Each side wall 13 protrudes from an outer edge 12a of the body 12 toward one side (lower side in FIG. 1) in the thickness direction of the body 12. In the following description, one side in the thickness direction is referred to as a downward direction, and the other side in the thickness direction is referred to as an upward direction. A basal end region 13a of each side wall 13, that is, an upper end region of the side wall 13 in FIG. 1 is curved and connected to the body 12 of the molded product 11. Each wrapped portion 14 protrudes inward of a corresponding side wall 13 from the distal end of the side wall 13 in the protruding direction. The wrapped portion 14 is folded back in the vertical direction at multiple locations inside the side wall 13. Specifically, the wrapped portion 14 is bent upward at the distal end of the side wall 13 and then bent downward. The end of the wrapped portion 14 opposite to the end connected to the side wall 13 may be referred to as an inner end.

Mold Structure

The mold structure for manufacturing the molded product 11 includes a movable mold 15 and a fixed mold 16, and includes a first insert 17 and a second insert 18 that are arranged in the movable mold 15. The first insert 17 and the second insert 18 protrude from the movable mold 15 toward the fixed mold 16. The first insert 17 and the second insert 18 are movable relative to the movable mold 15 in the vertical direction. In other words, the first insert 17 and the second insert 18 are movable relative to the fixed mold 16 in a direction of approaching and moving away. The second insert 18 passes through the first insert 17 in the vertical direction and is movable relative to the first insert 17 in the vertical direction.

In the mold structure, molten resin can be injected into a molding space between the movable mold 15 and the fixed mold 16 when the mold structure is clamped. Specifically, molten resin can be injected into a molding space defined by the movable mold 15, the first insert 17, the second insert 18, and the fixed mold 16. The solidification of this resin results in the formation of the molded product 11 within the molding space.

The first insert 17 and the second insert 18 will now be described in detail.

First Insert 17

The first insert 17 has a molded portion 17a. The molded portion 17a is positioned on the inner side of the molded product 11 during clamping. The molded portion 17a includes a part shaped in conformance with the inner surface of each side wall 13 of the molded product 11. The molded portion 17a also includes a part shaped in conformance with the inner surface of each wrapped portion 14 of the molded product 11. The molded portion 17a has a surface 17b that is in contact with the second insert 18. The surface 17b is inclined with respect to the vertical direction such that the surface 17b approaches the side wall 13 as the proximity to the molded product 11 increases.

Second Insert 18

The second insert 18 includes a contact surface 18a that is in contact with the molded product 11 during clamping.

The contact surface 18a is shaped in conformance with the inner surface of the body 12 and the inner surface of the basal end region 13a of each side wall 13, and is in contact with the inner surface of the body 12 and the inner surface of the basal end region 13a of the side wall 13. Each edge of the contact surface 18a is located closer to the distal end of a corresponding side wall 13 than the position where a corresponding basal end region 13a of the side wall 13 is connected to the body 12. In other words, each edge of the contact surface 18a is located outward from the position where the basal end region 13a of a corresponding side wall 13 is connected to the body 12 in the sideward direction, which is orthogonal to the thickness direction. Specifically, each edge of the contact surface 18a is located closer to the distal end of a corresponding side wall 13 than the inner end of a corresponding wrapped portion 14 in the sideward direction, that is, located outward from the inner end. The position where the basal end region 13a of the side wall 13 is connected to the body 12 corresponds to the outer edge 12a of the body 12.

The second insert 18 has a side surface 18b that is in contact with the first insert 17. The side surface 18b is connected to the contact surface 18a. The side surface 18b is inclined with respect to the vertical direction such that the side surface 18b approaches each side wall 13 as the proximity to the contact surface 18a increases. As a result, each edge of the contact surface 18a is positioned outward in the sideward direction from the inner end of a corresponding wrapped portion 14. The side surface 18b of the second insert 18 is in contact with the surface 17b of the molded portion 17a of the first insert 17.

The part of the contact surface 18a corresponding to the basal end region 13a of each side wall 13 is a curved surface that is curved to be in planar contact with the basal end region 13a of the side wall 13.

The method for manufacturing the molded product 11 will now be described.

Referring to FIG. 1, molten resin is injected into the molding space between the movable mold 15 and the fixed mold 16 when the mold structure is clamped. When the resin solidifies in the molding space, the first insert 17 is located at a position corresponding to the side wall 13 inside the molded product 11. In this state, the second insert 18 is located at a position corresponding to the body 12 inside the molded product 11. However, a part of the second insert 18 relatively close to the side surface 18b extends beyond the body 12 of the molded product 11 toward the basal end region 13a of the side wall 13.

Figure 2:
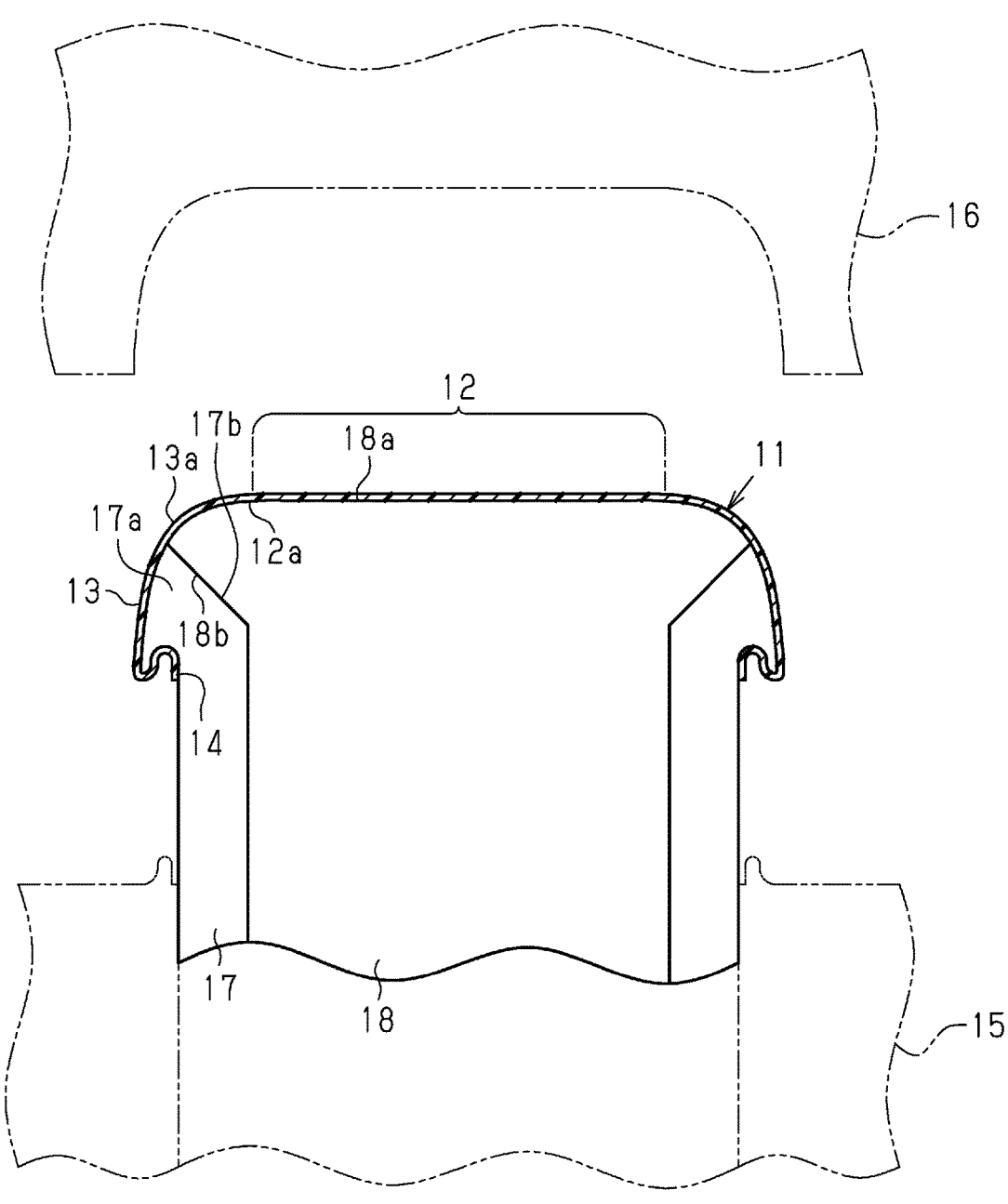
FIG. 2 is a schematic view showing a state in which the mold structure of FIG. 1 is being opened.

Then, as shown in FIG. 2, the mold structure is opened. At the initial stage of the opening, the movable mold 15 separates from the fixed mold 16, and the first insert 17 and the second insert 18 integrally separate from the movable mold 15. At the final stage of the opening, while the movable mold 15 continues to separate from the fixed mold 16, the first insert 17 stops separating from the movable mold 15. That is, whereas the movement of the second insert 18 is stopped, the first insert 17 moves integrally with the movable mold 15. Consequently, as shown in FIG. 3, the first insert 17 moves relative to the second insert 18 in a direction away from the second insert 18 (downward in FIG. 3). This causes the first insert 17 to be pulled out of the molded product 11.

After the first insert 17 is pulled out of the molded product 11, the molded product 11 in contact with the contact surface 18a is removed from the second insert 18. The molded product 11 may be removed from the second insert 18 by ejecting air from the second insert 18. In this case, even when the molded product 11 has an undercut portion, that is, a portion that serves as a hook during the removal of the molded product 11 from the second insert 18, the molded product 11 is removable from the second insert 18.

The operational advantages of the mold structure and the method for manufacturing the molded product 11 of the present embodiment will now be described.

Figure 3:
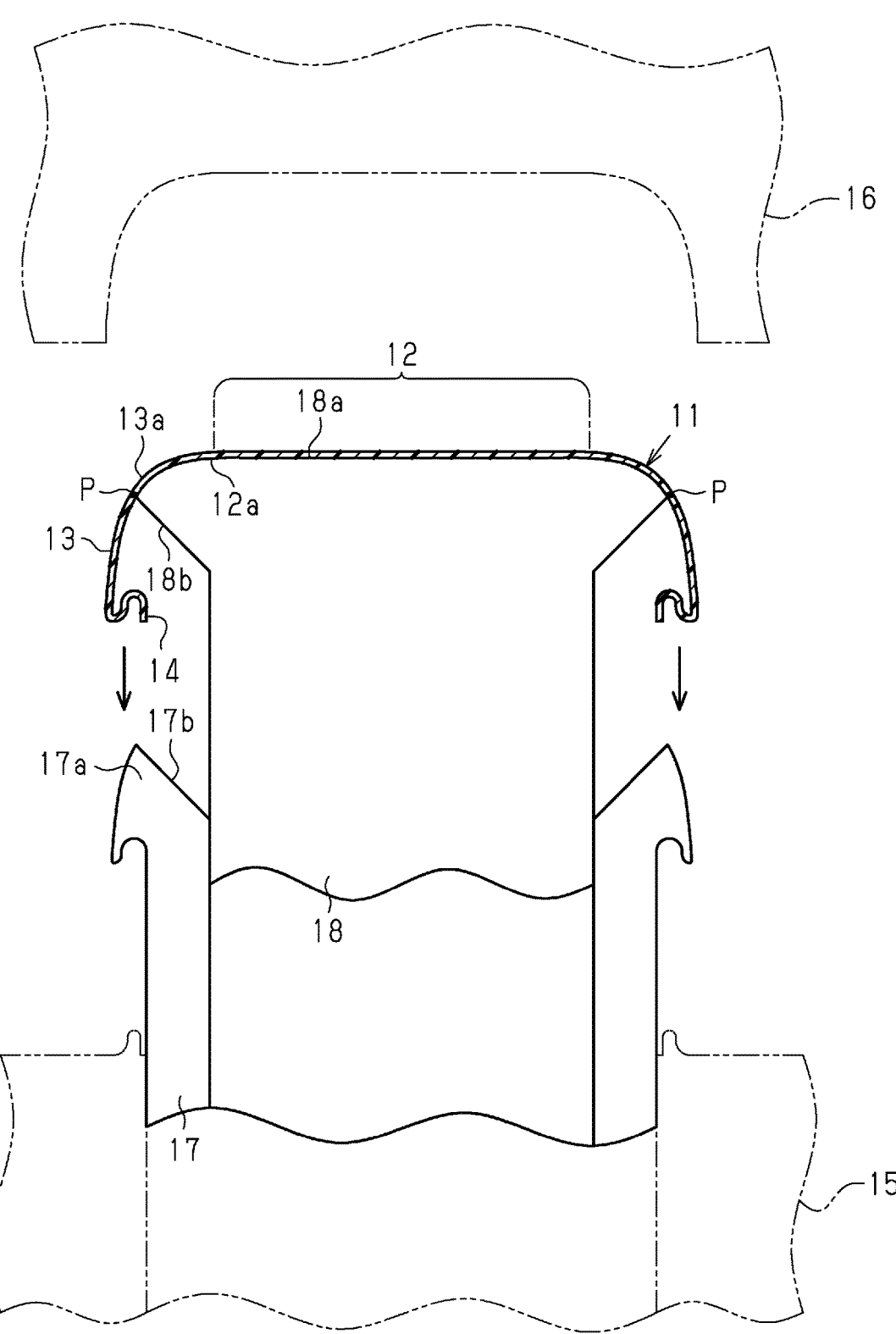
FIG. 3 is a schematic view showing a state in which the mold structure of FIG. 1 is opened.

(1) When the second insert 18 separates from the first insert 17 during mold opening, the first insert 17 is pulled out of the molded product 11 as shown in FIGS. 2 and 3. This causes each side wall 13 to be pulled in the direction indicated by the arrow in FIG. 3 by the molded portion 17a of the first insert 17. When the pulling force acts on the side wall 13, stress concentrates on a location P of the molded product 11 in contact with each edge of the second insert 18, that is, the location P of the molded product 11 corresponding to the edge of the contact surface 18a. Each edge of the contact surface 18a is located closer to the distal end of a corresponding side wall 13 of the molded product 11 than the position where the basal end region 13a of the side wall 13 is connected to the body 12. Thus, even if the side wall 13 greatly extends outward beyond the body 12, the concentration of stress at the location P in the molded product 11 is reduced. This limits deformation of the location P in the molded product 11 due to the stress.

(2) Each edge of the contact surface 18a of the second insert 18 is located closer to the distal end of a corresponding side wall 13 than the inner end of a corresponding wrapped portion 14 in the sideward direction. As a result, when the side wall 13 is pulled in the direction indicated by the arrow in FIG. 3 by the molded portion 17a of the first insert 17, the concentration of stress at the location P in the molded product 11 is reduced more effectively.

(3) The side surface 18b of the second insert 18, which is in contact with the surface 17b of the first insert 17, is connected to the contact surface 18a, and inclined with respect to the vertical direction such that the side surface 18b approaches each side wall 13 as the proximity to the contact surface 18a increases. This allows each edge of the contact surface 18a of the second insert 18 to be readily positioned closer to the distal end of a corresponding side wall 13 than the position where the basal end region 13a of the side wall 13 is connected to the body 12. Specifically, each edge of the contact surface 18a of the second insert 18 is readily positioned closer to the distal end of a corresponding side wall 13 than the inner end of a corresponding wrapped portion 14 of the molded product 11 in the sideward direction.

(4) The part of the contact surface 18a of the second insert 18 corresponding to the basal end region 13a of each side wall 13 is a curved surface that is in planar contact with the basal end region 13a, which is curved, in the side wall 13. For this reason, when the side wall 13 is pulled by the molded portion 17a of the first insert 17, the occurrence of stress concentration at the location P of the molded product 11 in contact with the curved portion of the contact surface 18a is limited.

The above embodiment may be modified as follows.

Figure 4:
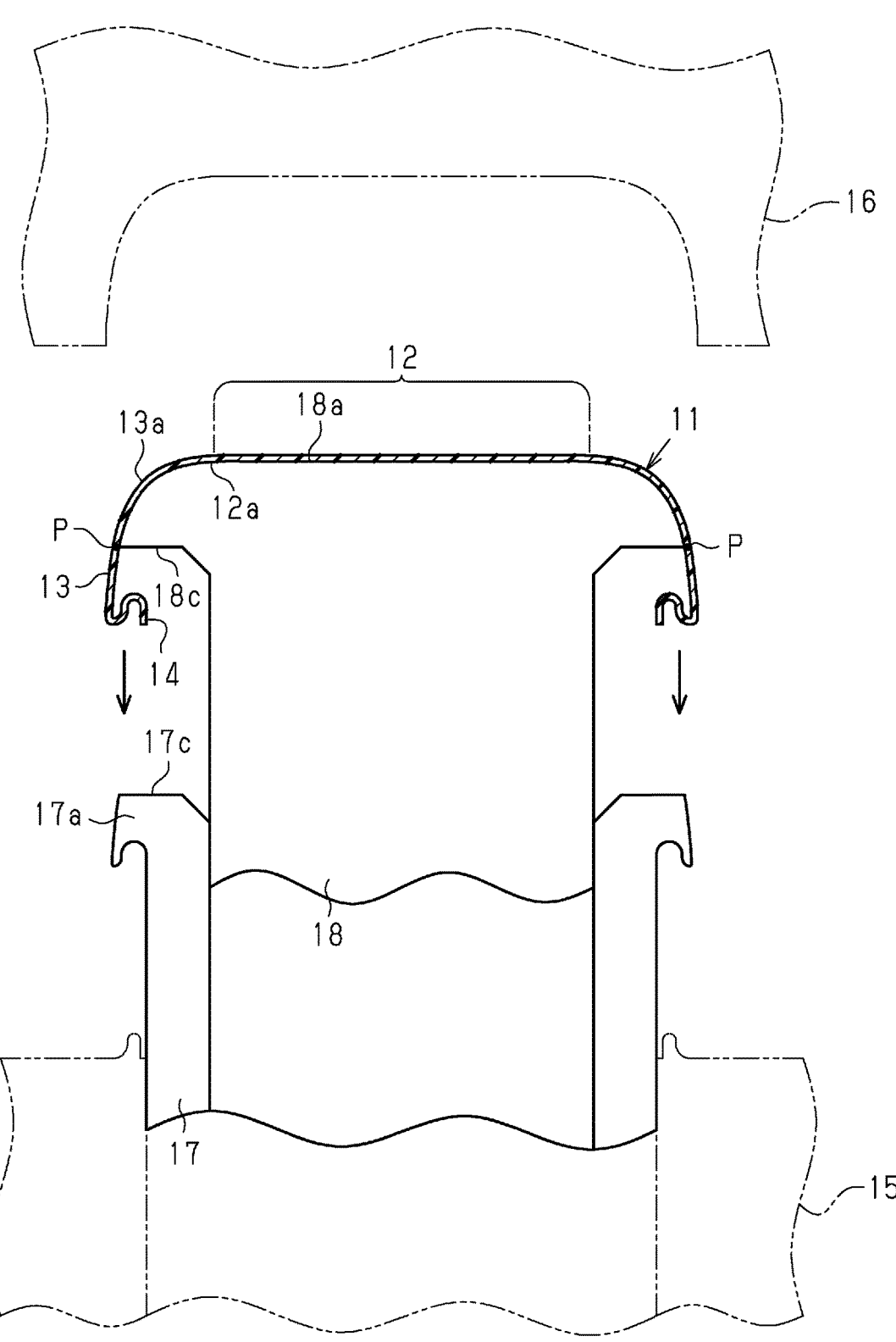
FIG. 4 is a schematic view showing the mold structure of FIG. 1 according to a modification.

The side surface 18b of the second insert 18 does not necessarily need to be inclined. For example, as shown in FIG. 4, the second insert 18 and the first insert 17 respectively have a surface 18c and a surface 17c, which are orthogonal to the vertical direction. The second insert 18 and the first insert 17 may be in contact with each other on the surface 18c and the surface 17c.

The invention claimed is:

1. A mold structure used for manufacturing a resin molded product, the molded product including a plate-shaped body, a side wall, and a wrapped portion, the side wall protruding from an outer edge of the body toward one side in a thickness direction of the body, the side wall having a basal end region that is curved and connected to the body, and the wrapped portion protruding inward of the side wall from a distal end of the side wall, the mold structure comprising:

a fixed mold and a movable mold; and a first insert and a second insert disposed in the movable mold, wherein the mold structure is configured to define a space into which molten resin can be injected between the fixed mold and the movable mold when the mold structure is clamped, the mold structure is configured such that when the resin solidifies between the fixed mold and the movable mold, the first insert is located at a position corresponding to the side wall inside the molded product, and the second insert is located at a position corresponding to the body inside the molded product, the first insert is configured to be pulled out of the molded product by separating from the second insert when the mold structure is opened, while the second insert remains in contact with the molded product, the second insert has a contact surface for the molded product, the contact surface having, as viewed in a cross section, a straight portion and a curved portion, and when the mold structure is clamped, an edge of the contact surface is located below the straight portion and closer to the distal end of the side wall than a position where the basal end region of the side wall is connected to the body.

2. The mold structure according to claim 1, wherein the wrapped portion has an inner end opposite to an end connected to the side wall, and when the mold structure is clamped, the edge of the contact surface is located closer to the distal end of the side wall than the inner end of the wrapped portion in a direction that is orthogonal to the thickness direction.

3. The mold structure according to claim 1, wherein the second insert has a side surface in contact with the first insert, and the side surface is an inclined surface connected to the contact surface, and inclined with respect to the thickness direction such that the side surface approaches the side wall as proximity to the contact surface increases.

4. The mold structure according to claim 1, wherein a portion of the contact surface corresponding to the basal end region of the side wall is a curved surface that is curved so as to be in planar contact with the basal end region.

5. A method for manufacturing a resin molded product, the molded product including a plate-shaped body, a side wall, and a wrapped portion, the side wall protruding from an outer edge of the body toward one side in a thickness direction of the body, the side wall having a basal end region that is curved and connected to the body, and the wrapped portion protruding inward of the side wall from a distal end of the side wall, the method comprising:

a step of preparing a mold structure that includes a movable mold and a fixed mold, wherein a first insert and a second insert are disposed in the movable mold;

a step of injecting molten resin between the movable mold and the fixed mold when the mold structure is clamped, wherein, when the resin solidifies between the fixed mold and the movable mold, the first insert is located at a position corresponding to the side wall inside the molded product, and the second insert is located at a position corresponding to the body inside the molded product;

a step of pulling the first insert out of the molded product by separating the second insert and the first insert from each other when opening the mold structure; and a step of removing the molded product from the second insert with the first insert pulled out of the molded product, wherein the second insert has a contact surface for the molded product, the contact surface having, as viewed in a cross section, a straight portion and a curved portion, and when the mold structure is clamped, an edge of the contact surface is located below the straight portion and closer to the distal end of the side wall than a position where the basal end region of the side wall is connected to the body.

*   *   *   *   *